United States Patent
Tang et al.

(10) Patent No.: US 7,839,798 B2
(45) Date of Patent: Nov. 23, 2010

(54) SEAMLESSLY SWITCHING OVERLAY NETWORK RELAY TREES

(75) Inventors: Jian Tang, Beijing (CN); Chong Luo, Beijing (CN); Jiang Li, Beijing (CN)

(73) Assignee: Microsoft Corporation, Redmond, WA (US)

( * ) Notice: Subject to any disclaimer, the term of this patent is extended or adjusted under 35 U.S.C. 154(b) by 462 days.

(21) Appl. No.: 11/766,958

(22) Filed: Jun. 22, 2007

(65) Prior Publication Data

US 2008/0317044 A1 Dec. 25, 2008

(51) Int. Cl.
*H04L 12/28* (2006.01)
(52) U.S. Cl. ..................................................... 370/254
(58) Field of Classification Search .................. None
See application file for complete search history.

(56) References Cited

U.S. PATENT DOCUMENTS

| | | | |
|---|---|---|---|
| 5,309,433 A | 5/1994 | Cidon et al. | |
| 5,459,725 A | 10/1995 | Bodner et al. | |
| 6,154,463 A | 11/2000 | Aggarwal et al. | |
| 6,331,983 B1 | 12/2001 | Haggerty et al. | |
| 6,625,773 B1 | 9/2003 | Boivie et al. | |
| 7,171,491 B1 | 1/2007 | O'Toole et al. | |
| 2001/0034793 A1 | 10/2001 | Madruga et al. | |
| 2004/0047300 A1 | 3/2004 | Enomoto et al. | |
| 2005/0243722 A1 | 11/2005 | Liu et al. | |
| 2006/0098664 A1 | 5/2006 | De Dona | |
| 2007/0091827 A1* | 4/2007 | Boers et al. | 370/255 |
| 2007/0127396 A1* | 6/2007 | Jain et al. | 370/254 |
| 2007/0133530 A1* | 6/2007 | Previdi et al. | 370/390 |
| 2008/0069099 A1* | 3/2008 | Tani et al. | 370/390 |
| 2008/0095163 A1* | 4/2008 | Chen et al. | 370/392 |

OTHER PUBLICATIONS

Tan et al., "Improving the Fault Resilience of Overlay Multicast for Media Streaming", vol. 18, Issue 6, Jun. 2007 IEEE Press, pp. 1-10.
Yeo et al., "Application Layer Multicast Architecture for Media Streaming", retrieved at<<http://www.actapress.com/PaperInfo.aspx?PaperID=14753>>, 2007, ACTA Press, pp. 1.
"Multicast Tree Generation and Update",available at least as early as Mar. 23, 2007, at <<http://www.usenix.org/events/usits01/full_papers/shi/shi_html/node6.html>>, pp. 1-2.
Shimizu, "Tree-varying multicast on an overlay network of unreliable end hosts", Jan. 2004, pp. 1.
Pendarakis et al., "ALMI: An Application Level Multicast Infrastructure", 2000, pp. 1-17.

* cited by examiner

*Primary Examiner*—Chirag G Shah
*Assistant Examiner*—Amarnauth Persaud

(57) ABSTRACT

Technologies for switching a set of nodes in an overlay network from one relay tree configuration to another without duplicate packets or packet loss at any of the nodes. A commander node calculates a new relay tree as well as a media stream set configuration for each node in the overlay network, each media stream set corresponding to the new relay tree. Media stream sets include a unique version number or the like that identifies the specific relay tree configuration of which they are a part. Also provided are technologies for associating a media stream with a particular relay tree configuration and the corresponding media stream set of each node in the overlay network.

18 Claims, 5 Drawing Sheets

SEAMLESSLY SWITCHING OVERLAY NETWORK RELAY TREES

BACKGROUND

Overlay networks are useful in creating virtual networks over other networks, such as the Internet or a corporate network. Such overlay networks have been considered as a means of improving Internet routing, particularly for bandwidth-demanding applications such as video conferencing, multi-party games, content distribution, distributed simulations, etc. In an overlay network, data are typically disseminated from a single source to multiple receivers via a relay tree. Although an overlay network cannot control how data packets are routed over the underlying network (i.e., the Internet) between two overlay network nodes, a relay tree can control the sequence of overlay network nodes a packet traverses in order to reach its destination. The various paths or links of an overlay network may need to be reorganized from time to time to improve performance as underlying network characteristics change, and/or address problems such as failed nodes or pathways. But transitioning or switching from one overlay network to another often results in the inefficiencies of duplicate and/or lost packets and re-transmission of packets. It is desirable to avoid such inefficiencies.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present examples provide technologies for switching a set of nodes in an overlay network from one relay tree configuration to another without duplicate packets or packet loss at any of the nodes. A commander node calculates a new relay tree as well as a media stream set configuration for each node in the overlay network, each media stream set corresponding to the new relay tree. Media stream sets include a unique version number or the like that identifies the specific relay tree configuration of which they are a part. Also provided are technologies for associating a media stream with a particular relay tree configuration and the corresponding media stream set of each node in the overlay network.

Many of the attendant features will be more readily appreciated as the same become better understood by reference to the following detailed description considered in connection with the accompanying drawings.

DESCRIPTION OF THE DRAWINGS

The present description will be better understood from the following detailed description considered in connection with the accompanying drawings, wherein:

FIG. 1b is a diagram showing an example newer relay tree comprised of the same nodes and a different structure as the example relay tree of FIG. 1a.

Like reference numerals are used to designate like parts in the accompanying drawings.

DETAILED DESCRIPTION

The detailed description provided below in connection with the accompanying drawings is intended as a description of the present examples and is not intended to represent the only forms in which the present examples may be constructed or utilized. The description sets forth at least some of the functions of the examples and/or the sequence of steps for constructing and operating examples. However, the same or equivalent functions and sequences may be accomplished by different examples.

Although the present examples are described and illustrated herein as being implemented in a computing and network environment, the technologies described as provided as examples and not limitations. As those skilled in the art will appreciate, the present examples are suitable for application in a variety of different types of computing and networking environments.

Figure 1A:
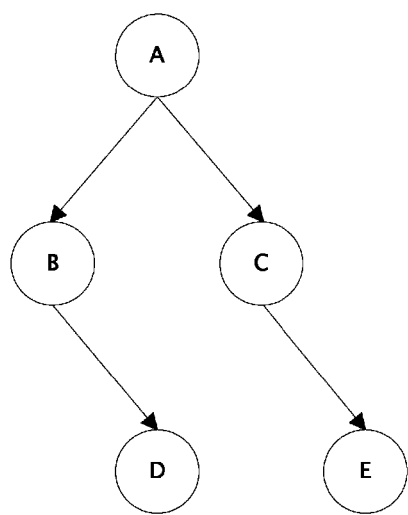
FIG. 1a is a diagram showing an example overlay network relay tree.

FIG. 1a is a diagram showing an example overlay network relay tree. Node A is the source node providing data to nodes B and C which in turn forward the data to nodes D and E respectively. Such a relay tree may be formed over an underlying network, such as the Internet or a corporate network or the like. While the path the data traverses over the underlying network cannot typically be controlled by the relay tree, the particular nodes of the relay tree that the data traverses can be controlled. Such a relay tree is typically calculated by a commander ("CDR"), a logical role that may be played by any node in the overlay network. Such a CDR node may or may not be a node in the relay tree.

The relay tree is typically calculated by the CDR node to optimize performance. In order to adapt to changing network conditions, the relay tree computed by the CDR node may change from time to time. If the relay nodes are not well coordinated at the time of transition from an older relay tree to a newer relay tree, then some nodes may experience packet loss while others may receive duplicate packets. The coordination of nodes in such a distributed system can be difficult even where a synchronization clock is employed. Even when all nodes switch relay trees at the exact same time, packet loss and/or duplication may still occur.

Figure 1B:
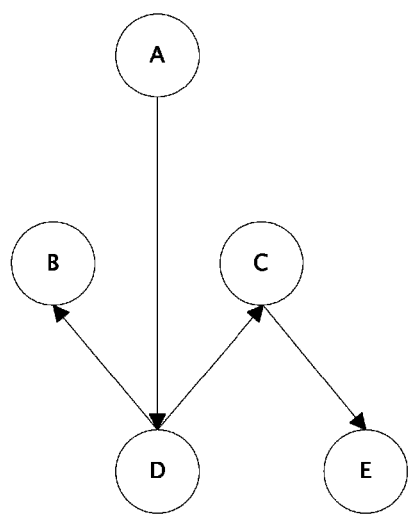

FIG. 1b is a diagram showing an example newer relay tree comprised of the same nodes and a different structure as the example relay tree of FIG. 1a. Such a newer tree may be calculated by a CDR node to replace the older tree of FIG. 1a. Once again, node A is the source node, but in the newer relay tree data is disseminated to node D which forwards the data to nodes B and C with node C forwarding the data to node E. Alternatively Any other tree structure may be calculated for data dissemination, the structure typically based on the calculations and optimization considerations of the CDR node.

Relay trees shown in FIGS. 1a and 1b are examples only and should not be construed as limiting.

Consider video data being streamed from node A to nodes B through E. The CDR node, which may be any of nodes A through E, may initially calculate the relay tree of FIG. 1a for video data distribution. In an attempt to optimize performance and/or other characteristics given the dynamics of the underlying network, the CDR node may re-calculate the overlay network relay tree as shown in FIG. 1b. Assuming the overlay latency of each link is 100 milliseconds ("ms"), and the transmitted video has a frame rate of 30 frames-per-second ("fps"), then the 100 ms latency translates to approximately a three-frame latency. Thus, in the original relay tree of FIG. 1a, when node A is producing the $i^{th}$ frame, nodes B and C are receiving the $(i-3)^{th}$ frame, and nodes D and E are receiving the $(i-6)^{th}$ frame. Now, if all nodes in the overlay network switch at the same time to the new relay tree configuration shown in FIG. 1b, then the next packet received by node D is the $(i-2)^{th}$ frame, the next packet received by nodes B and C is the $(i-5)^{th}$ frame, and the next packet received by node E is the $(i-8)^{th}$ frame. Table 1 indicates how nodes B, C, D, and E are affected by the relay tree switch.

TABLE 1

| Node | Impact |
|---|---|
| B | Gets three duplicate frames: $(i-5)^{th}$, $(i-4)^{th}$, $(i-3)^{th}$ |
| C | Gets three duplicate frames: $(i-5)^{th}$, $(i-4)^{th}$, $(i-3)^{th}$ |
| D | Loses three frames: $(i-5)^{th}$, $(i-4)^{th}$, $(i-3)^{th}$ |
| E | Gets three duplicate frames: $(i-8)^{th}$, $(i-7)^{th}$, $(i-6)^{th}$ |

The present invention addresses the problems of lost and duplicate packets or the like upon a switch from one relay tree to another.

Figure 2:
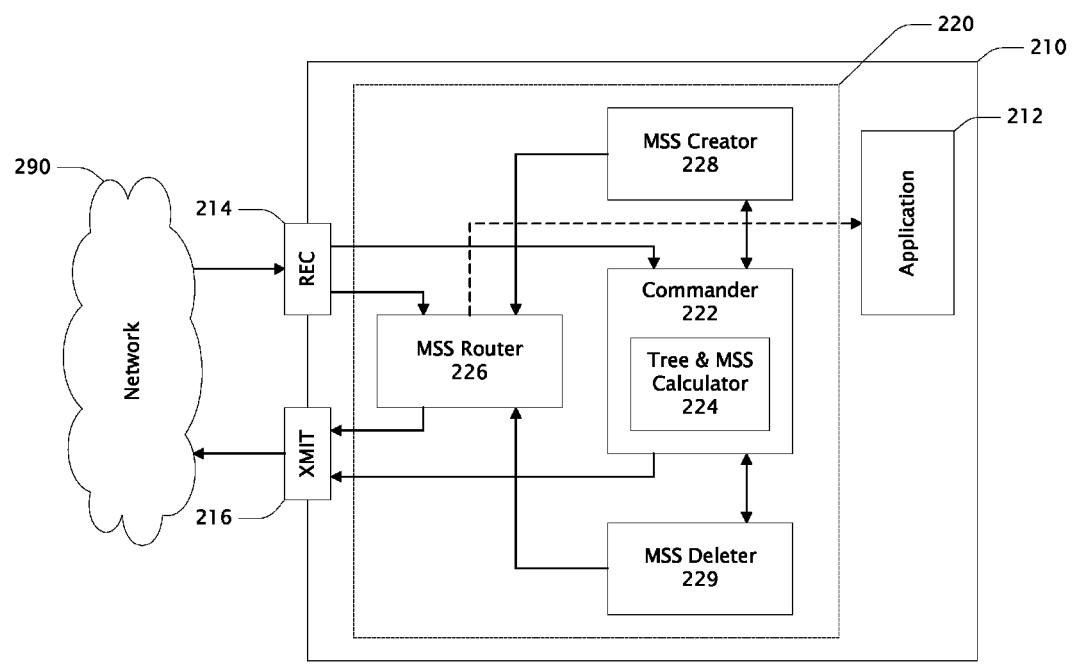
FIG. 2 is a block diagram showing an example relay tree management ("RTM") system 220 operating in an example computing environment, such as that described in connection with FIG. 5.

FIG. 2 is a block diagram showing an example relay tree management ("RTM") system 220 operating in an example computing environment 210, such as that described in connection with FIG. 5. Computing environment 210 typically includes a transmitting or sending means 216 and a receive means 214, both means typically coupled to an underlying network 290. RTM system 220 typically includes the components: commander 222 with calculator 224 for calculating overlay network relay tree structures and/or media stream sets (MSS); MSS creator 228 for creating an MSS on a node; MSS deleter 229 for deleting an MSS from a node; and MSS router 226 for routing packets based on their identified MSS. In alternate examples, these components may be combined and/or further divided in any suitable manner. RTM system 220 typically communicates with other nodes via receive means 214 and transmit means 216 of computing environment 210.

The term node as used herein typically refers to any computing environment, computer system, device, process, or the like that may be uniquely addressable, or otherwise uniquely identifiable, in a network (e.g., network 290) and that is operable to communicate with other nodes in the network, such as node 210. For example, and without limitation, a node may be a personal computer, a server computer, a hand-held or laptop device, a tablet device, a multiprocessor system, a microprocessor-based system, a set top box, a consumer electronic device, a network PC, a minicomputer, a mainframe computer, a cell phone, or any computing environment or device or system including a computing environment or the like. An example of a node is set forth below with respect to FIG. 5.

In a CDR node, commander 222 is typically a means for performing commander functionality including determining when to calculate a new relay tree structure, calculating such a structure using tree & MSS calculator 224. In a CDR node, commander 222 also typically calculates an MSS configuration for each node in the new relay tree. Each MSS, typically identified by a version number or the like, includes an inbound stream identifier and zero or more outbound stream identifiers. Each such stream identifier typically identifies a link with another node in the relay tree—either an inbound link or an outbound link. Commander 222 typically communicates with other nodes via receive means 214 and transmit means 216. Such receive means and transmit means may be a communications connection, such as communications connection 514 described in connection with FIG. 5.

In a non-CDR node, commander 222 may receive an MSS configuration and communicate with MSS creator 228 such that a corresponding MSS is created on the node. Commander 222 may also determine that an older MSS should be deleted and communicate with MSS deleter 229 such that the older MSS is deleted from the node. MSS configurations and the like are typically received via receive means 214. Such receive means may be a communications connection, such as communications connection 514 described in connection with FIG. 5.

MSS creator 226 typically creates a new MSS based on a received MSS configuration. The new MSS is typically created by configuring MSS router 226 based on the MSS configuration. MSS delete 229 typically deletes an existing MSS once it is no longer needed, typically as indicated by commander 222. The existing MSS is typically deleted by configuring MSS router 226 to remove the MSS configuration from the router. A particular MSS is typically identified by a version number or the like.

MSS router 226 typically receives MSS data packets via receive means 214 and inspects the packets to determine their MSS version number. Given a matching MSS configuration, MSS router 226 forwards the data packets to any other nodes in the relay tree designated by the MSS configuration via transmit means 216. MSS router 226 may also forward data packets to one or more applications 212 operating in computing environment 210. For example, in a video conference, MSS router 226 receives media packets from a sending node and forwards those packets to a media application and to any other nodes designated by the MSS configuration.

Figure 3A:
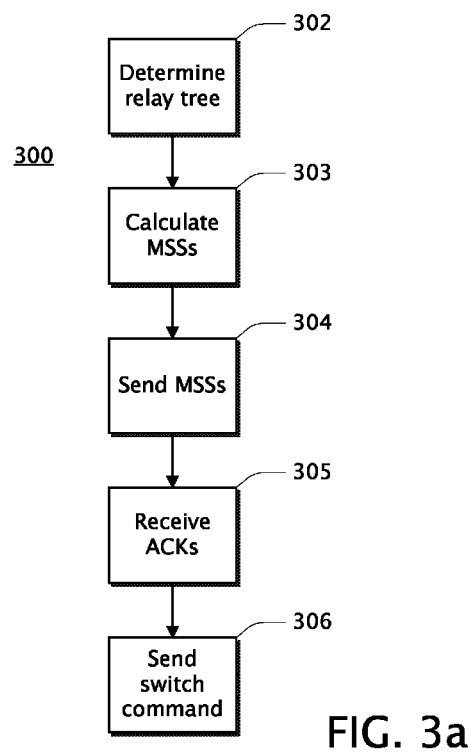
FIG. 3a is a block diagram showing an example method for use by a commander node to seamlessly switch an overlay network from an old relay tree to a new relay tree.

FIG. 3a is a block diagram showing an example method 300 for use by a CDR node to seamlessly switch an overlay network from an old relay tree to a new relay tree. Method 300 provides for designating a new relay tree configuration and for switching an overlay network from an old relay tree configuration to the new relay tree configuration without duplicate packets or packet loss at any of the nodes in the overlay network—a seamless transition from the old tree to the new tree.

Block 302 typically indicates determining or calculating a new relay tree configuration. A CDR node may calculate a new relay tree the first time an overlay network is created. Or, the CDR node may calculate a new relay tree in preference to the existing tree in an effort to optimize the overlay network in response to changes in the performance characteristics or the like of the underlying network. The CDR node may be the only node in the overlay network to have a complete view of the relay tree structure. Once the new relay tree is calculated, method 300 typically continues at block 303.

Block 303 typically indicates calculating an MSS configuration for each node in the overlay network. The CDR typically calculates the MSS configuration for each node in the overlay network, the MSS configuration corresponding to the new relay tree calculated in connection with block 302. Such an MSS configuration typically describes the inbound link to the node, or the node from which MSS packets will arrive, and any outbound links, or any nodes to which MSS packets will be forwarded. The MSS configuration also includes an MSS version number or the like which uniquely identifies the MSS configuration and the specific relay tree with which it is associated. Once an MSS configuration is calculated for each node in the relay tree, method 300 typically continues at block 304.

Block 304 typically indicates sending each MSS configuration to its corresponding node in the overlay network, each MSS configuration representing a portion of the new relay tree from the perspective of its corresponding node. Once the CDR node sends all of the MSS configurations, method 300 typically continues at block 305.

Block 305 typically indicates receiving acknowledgements ("ACKs") from each of the overlay network nodes indicating that the MSS configuration was received and created without error. At this point, all nodes comprising the new relay tree are liked and configured in the new relay tree structure, as well as in one or more old relay tree structures. If an ACK is not received from one or more of the overlay nodes within a particular time-frame (indicating an error), then method 300 may return to the step indicated by block 302 to calculate another new relay tree taking into account the errors. In one example, one or more nodes may go off-line or otherwise fail to continue operation in the overlay network. In another example, communication links to one or more nodes via the underlying network may fail. A new relay network may be calculated to exclude such nodes. When all nodes in the overlay network respond to the CDR node with ACKs, method 300 typically continues at block 306.

Block 306 typically indicates sending a switch command to the top-most node of the new relay tree. The CDR node typically sends the command to switch to the new relay tree to the top-most node or source node of the new relay tree, the new tree being identified by its version number or the like. Upon receipt of this command, the source node sends the next packet in the media stream associated with the old relay tree over the new relay tree structure. These packets are typically associated with the new MSS configuration and relay tree. Upon receipt of such new packets by down-stream nodes, they also associate the packets with the new MSS configuration and utilize their corresponding MSS configurations, thus switching to the new relay tree at each node as the MSS data flows through the overlay network. Any older data is associated with the older MSS configuration and relay tree and continues to flow via the older relay tree until it has all been delivered. Once the switch command has been successfully sent, method 300 is complete with the overlay network seamlessly transitioning from the old relay tree to the new relay tree without duplicate packets or packet loss.

Figure 3B:
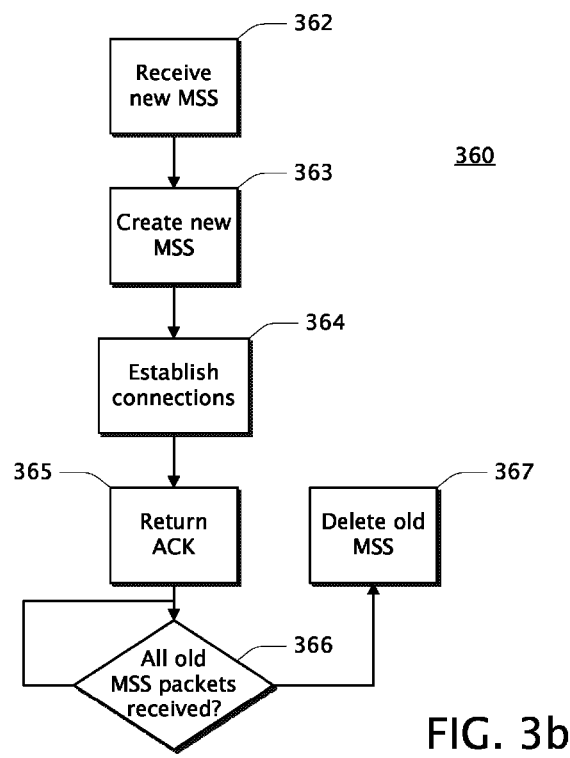
FIG. 3b is a block diagram showing an example method for use by overlay network nodes to transition from an old relay tree to a new relay tree.

FIG. 3b is a block diagram showing an example method 360 for use by overlay network nodes to transition from an old relay tree to a new relay tree. Method 360 provides for the node receiving a new MSS configuration, linking itself into the new tree structure corresponding to the new MSS configuration, and eventually deleting the old MSS configuration corresponding to the old relay tree.

Block 362 typically indicates the node receiving a new MSS configuration from a CDR node. Such a new MSS configuration typically includes a new unique version number or the like corresponding to the new relay tree. Once a new MSS configuration is received, method 360 typically continues at block 363.

Block 363 typically indicates creating a new MSS corresponding to the received new MSS configuration. Once the node has created the new MSS, such as appropriately configuring an MSS router or the like, method 360 typically continues at block 364.

Block 364 typically indicates establishing communications with other nodes in the overlay network indicated by the new MSS configuration. For example, the node may establish or accept a network connection with an upstream node and with zero or more downstream nodes as indicated by the new MSS configuration. Once the appropriate connections are established inserting the nodes in its appropriate place in the new relay tree structure, method 360 typically continues at block 365.

Block 365 typically indicates returning an ACK to the CDR node upon successfully creating the new MSS and establishing the corresponding communications with other nodes in the overlay network indicated by the new MSS configuration. If the node is unable to create the new MSS or establish the corresponding communication, then an error is typically returned to the CDR node. Method 300 typically continues at block 366.

Block 366 typically indicates determining when a particular MSS configuration can be deleted. In general, an MSS configuration can be deleted when all MSS packets have been received for that MSS configuration, such as an old MSS configuration or an unused new MSS configuration. Each MSS configuration is typically identified by a version number or the like, which associates the MSS configuration with a corresponding relay tree. In one example, an older MSS configuration is deleted once it has received all data packets, i.e., data packets whose sequence numbers, time-stamps, or the like precede that of the first media packet received on the new MSS. Once it has been determined that an MSS configuration can be deleted, method 360 typically continues at block 367.

Block 367 typically indicates deleting an MSS configuration, such as an old MSS configuration. An MSS configuration is typically deleted once it is no longer being used, insuring that no data packets associated with the MSS configuration are lost.

Figure 4:
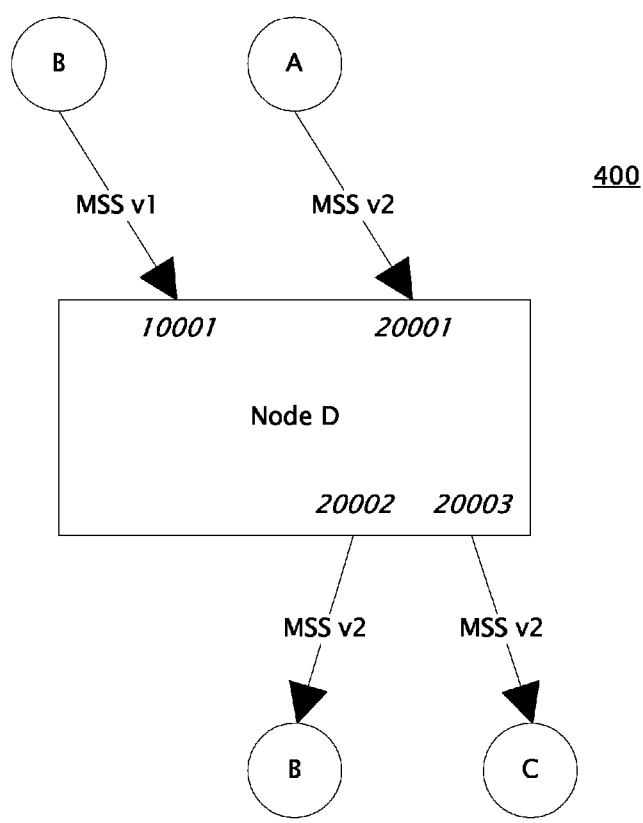
FIG. 4 is a block diagram showing one example for associating data packets with an MSS configuration and a corresponding relay tree.

FIG. 4 is a block diagram showing one example for associating data packets with an MSS configuration and a corresponding relay tree. For the older version of a relay tree, example Node D is configured via MSS configuration "MSS v1" to accept MSS v1 data from Node B. The MSS v1 configuration of Node D does not forward data to any other nodes. Data is associated with MSS v1 by being sent over port 10001, and indicated in FIG. 4. Any MSS data packets arriving at Node D via port 10001 are associated with MSS v1 and its corresponding relay tree.

For the newer version of the relay tree, example Node D is configured via MSS configuration "MSS v2" to accept MSS v2 data from Node A via port 20001. Node D forwards MSS v2 data to Node B via port 20002 and to Node C via port 20003. In general, port numbers are used to identify the specific MSS configuration and relay tree with which a data packet is associated. In alternate example, other mechanisms may be used to associate data packets with specific MSS configurations and relay trees, such as identification information provided in the data packets themselves, or the like.

Figure 5:
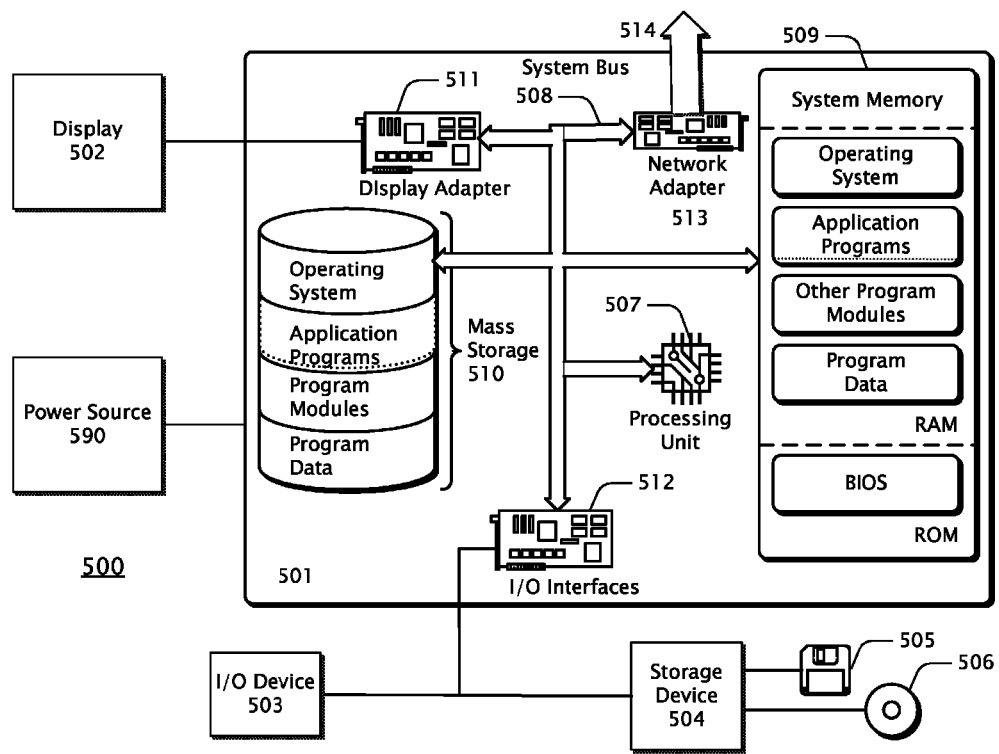
FIG. 5 is a block diagram showing an example computing environment in which the technologies described herein may be implemented.

FIG. 5 is a block diagram showing an example computing environment 500 in which the technologies described herein may be implemented. A suitable computing environment may be implemented with numerous general purpose or special purpose systems. Examples of well known systems may include, but are not limited to, cell phones, personal digital assistants ("PDA"), personal computers ("PC"), hand-held or laptop devices, microprocessor-based systems, multiprocessor systems, servers, workstations, consumer electronic devices, set-top boxes, and the like.

Computing environment 500 typically includes a general-purpose computing system in the form of a computing device 501 coupled to various components, such as peripheral devices 502, 503, 504 and the like. System 500 may couple to various other components, such as input devices 503, including voice recognition, touch pads, buttons, keyboards and/or pointing devices, such as a mouse or trackball, via one or more input/output ("I/O") interfaces 512. The components of computing device 501 may include one or more processors (including central processing units ("CPU"), graphics processing units ("GPU"), microprocessors ("μP"), and the like) 507, system memory 509, and a system bus 508 that typically couples the various components. Processor 507 typically processes or executes various computer-executable instructions to control the operation of computing device 501 and to communicate with other electronic and/or computing devices, systems or environment (not shown) via various communications connections such as a network connection 514 or the like. System bus 508 represents any number of several types of bus structures, including a memory bus or memory controller, a peripheral bus, a serial bus, an accelerated graphics port, a processor or local bus using any of a variety of bus architectures, and the like.

System memory 509 may include computer readable media in the form of volatile memory, such as random access memory ("RAM"), and/or non-volatile memory, such as read only memory ("ROM") or flash memory ("FLASH"). A basic input/output system ("BIOS") may be stored in non-volatile or the like. System memory 509 typically stores data, computer-executable instructions and/or program modules comprising computer-executable instructions that are immediately accessible to and/or presently operated on by one or more of the processors 507.

Mass storage devices 504 and 510 may be coupled to computing device 501 or incorporated into computing device 501 via coupling to the system bus. Such mass storage devices 504 and 510 may include non-volatile RAM, a magnetic disk drive which reads from and/or writes to a removable, non-volatile magnetic disk (e.g., a "floppy disk") 505, and/or an optical disk drive that reads from and/or writes to a non-volatile optical disk such as a CD ROM, DVD ROM 506. Alternatively, a mass storage device, such as hard disk 510, may include non-removable storage medium. Other mass storage devices may include memory cards, memory sticks, tape storage devices, and the like.

Any number of computer programs, files, data structures, and the like may be stored in mass storage 510, other storage devices 504, 505, 506 and system memory 509 (typically limited by available space) including, by way of example and not limitation, operating systems, application programs, data files, directory structures, computer-executable instructions, and the like.

Output components or devices, such as display device 502, may be coupled to computing device 501, typically via an interface such as a display adapter 511. Output device 502 may be a liquid crystal display ("LCD"). Other example output devices may include printers, audio outputs, voice outputs, cathode ray tube ("CRT") displays, tactile devices or other sensory output mechanisms, or the like. Output devices may enable computing device 501 to interact with human operators or other machines, systems, computing environments, or the like. A user may interface with computing environment 500 via any number of different I/O devices 503 such as a touch pad, buttons, keyboard, mouse, joystick, game pad, data port, and the like. These and other I/O devices may be coupled to processor 507 via I/O interfaces 512 which may be coupled to system bus 508, and/or may be coupled by other interfaces and bus structures, such as a parallel port, game port, universal serial bus ("USB"), fire wire, infrared ("IR") port, and the like.

Computing device 501 may operate in a networked environment via communications connections to one or more remote computing devices through one or more cellular networks, wireless networks, local area networks ("LAN"), wide area networks ("WAN"), storage area networks ("SAN"), the Internet, radio links, optical links and the like. Computing device 501 may be coupled to a network via network adapter 513 or the like, or, alternatively, via a modem, digital subscriber line ("DSL") link, integrated services digital network ("ISDN") link, Internet link, wireless link, or the like.

Communications connection 514, such as a network connection, typically provides a coupling to communications media, such as a network. Communications media typically provide computer-readable and computer-executable instructions, data structures, files, program modules and other data using a modulated data signal, such as a carrier wave or other transport mechanism. The term "modulated data signal" typically means a signal that has one or more of its characteristics set or changed in such a manner as to encode information in the signal. By way of example, and not limitation, communications media may include wired media, such as a wired network or direct-wired connection or the like, and wireless media, such as acoustic, radio frequency, infrared, or other wireless communications mechanisms.

Power source 590, such as a battery or a power supply, typically provides power for portions or all of computing environment 500. In the case of the computing environment 500 being a mobile device or portable device or the like, power source 590 may be a battery. Alternatively, in the case computing environment 500 is a desktop computer or server or the like, power source 590 may be a power supply designed to connect to an alternating current ("AC") source, such as via a wall outlet.

Some mobile devices may not include many of the components described in connection with FIG. 5. For example, an electronic badge may be comprised of a coil of wire along with a simple processing unit 507 or the like, the coil configured to act as power source 590 when in proximity to a card reader device or the like. Such a coil may also be configure to act as an antenna coupled to the processing unit 507 or the like, the coil antenna capable of providing a form of communication between the electronic badge and the card reader device. Such communication may not involve networking, but may alternatively be general or special purpose communications via telemetry, point-to-point, RF, IR, audio, or other means. An electronic card may not include display 502, I/O device 503, or many of the other components described in connection with FIG. 5. Other mobile devices that may not include many of the components described in connection with FIG. 5, by way of example and not limitation, include electronic bracelets, electronic tags, implantable devices, and the like.

Those skilled in the art will realize that storage devices utilized to provide computer-readable and computer-executable instructions and data can be distributed over a network. For example, a remote computer or storage device may store computer-readable and computer-executable instructions in the form of software applications and data. A local computer may access the remote computer or storage device via the network and download part or all of a software application or data and may execute any computer-executable instructions. Alternatively, the local computer may download pieces of the software or data as needed, or distributively process the software by executing some of the instructions at the local computer and some at remote computers and/or devices.

Those skilled in the art will also realize that, by utilizing conventional techniques, all or portions of the software's computer-executable instructions may be carried out by a dedicated electronic circuit such as a digital signal processor ("DSP"), programmable logic array ("PLA"), discrete circuits, and the like. The term "electronic apparatus" may include computing devices or consumer electronic devices comprising any software, firmware or the like, or electronic devices or circuits comprising no software, firmware or the like.

The term "firmware" typically refers to executable instructions, code, data, applications, programs, or the like maintained in an electronic device such as a ROM. The term "software" generally refers to executable instructions, code, data, applications, programs, or the like maintained in or on any form of computer-readable media. The term "computer-readable media" typically refers to system memory, storage devices and their associated media, and the like.

In view of the many possible embodiments to which the principles of the present invention and the forgoing examples may be applied, it should be recognized that the examples described herein are meant to be illustrative only and should not be taken as limiting the scope of the present invention. Therefore, the invention as described herein contemplates all such embodiments as may come within the scope of the following claims and any equivalents thereto.

The invention claimed is:

1. A system comprising:
a commander node of an overlay network formed over an underlying network, the commander node configured to:
responsive to one or more performance changes of the underlying network, calculate a configuration for a relay tree of the overlay network, wherein the relay tree includes a plurality of nodes forming a sequence traversable by a packet to reach a destination;
calculate multiple media stream set (MSS) configurations for the relay tree, wherein an individual MSS configuration corresponds to an individual node of the plurality of nodes and comprises an MSS configuration version number uniquely identifying the individual MSS configuration and the relay tree;
send the multiple MSS configurations to each of the plurality of nodes;
when a plurality of acknowledgments are received from each of the plurality of nodes within a time-frame, send a switch command to a source node of the plurality of nodes to switch to the relay tree, wherein an individual acknowledgement indicates receipt of a corresponding MSS configuration and creation of an MSS according to the corresponding MSS configuration; and
when at least one acknowledgement is not received from at least one node of the plurality of nodes, calculate another relay tree configuration for another relay tree that does not include the at least one node and calculate other MSS configurations for the another relay tree; and
at least one hardware processor configured to implement the commander node.

2. The system of claim 1, wherein the source node comprises a top-most node of the relay tree.

3. The system of claim 1 further comprising:
a media stream set creator operable to create a MSS based on the individual MSS configuration; and
a MMS router operable to route data packets based on the MSS.

4. The system of claim 3 wherein the MMS router is operable to forward the data packets to an application.

5. The system of claim 3 further comprising a MMS deleter operable to delete the MSS when the MSS is no longer in use.

6. The system of claim 5 wherein the MMS deleter is operable to delete an older MMS when sequence numbers of older data packets corresponding to the older MMS precede a further sequence number of a first data packet corresponding to the MMS.

7. The system of claim 1, wherein the plurality of nodes does not include the commander node.

8. The system of claim 1, wherein the individual MSS configuration further comprises a description of one or more other nodes of the plurality of nodes comprising at least one of: an inbound link from which the packet will arrive to the individual node or an outbound link to which the individual node will forward the packet.

9. A method implemented at least in part by a computing device, the method comprising:
receiving, on a node, a new media stream set (MMS) configuration from a commander node, the new MMS configuration associated with a new relay tree and comprising:
an MSS configuration version number uniquely identifying the new MSS configuration and the new relay tree; and
a description of one or more other nodes comprising at least one of:
an inbound link from which data packets will arrive to the node or an outbound link to which the node will route the data packets;
creating a new MMS on the node based on the new MMS configuration;
establishing communications with the one or more other nodes as specified by the new MMS, wherein the data packets correspond to the new MMS and are one or both of: received from the inbound link or routed to the outbound link, as indicated by the new MMS; and
waiting until old data packets associated with an old MMS on the node have been received and then deleting the old MMS.

10. The method of claim 9 further comprising returning an acknowledgement to the commander node, the acknowledgement indicating the node successfully receiving the new MMS configuration and creating the new MMS and establishing communications with the one or more other nodes as specified by the new MMS.

11. The method of claim 9 wherein the waiting includes determining when sequence numbers of the old data packets corresponding to the old MMS set precede a further sequence number of a first data packet of the data packets.

12. The method of claim 9 wherein the new MMS associates port numbers with the new relay tree.

13. The method of claim 12 wherein individual data packets of the date packets are routed via the port numbers indicated by the new MMS.

14. The method of claim 12 wherein the port numbers are used to distinguish between the new relay tree and one or both of:
an old relay tree or any other relay trees.

15. The method of claim 9 wherein the new MMS configuration is associated with the new relay tree using a version number.

16. A method implemented at least in part by a computing device, the method comprising:

responsive to one or more performance changes of an underlying network formed over an underlying network, calculating a configuration for a relay tree of the overlay network, wherein the relay tree includes a plurality of nodes forming a sequence traversable by a packet to reach a destination;

calculating multiple media stream set (MSS) configurations for the relay tree, wherein an individual MSS configuration corresponds to an individual node of the plurality of nodes and comprises an MSS configuration version number uniquely identifying the individual MSS configuration and the relay tree;

sending the multiple MSS configurations to each of the plurality of nodes;

when a plurality of acknowledgments are received from each of the plurality of nodes within a time-frame, sending a switch command to a source node of the plurality of nodes to switch to the relay tree, wherein an individual acknowledgement indicates receipt of a corresponding MSS configuration and creation of an MSS according to the corresponding MSS configuration; and when at least one acknowledgement is not received from at least one node of the plurality of nodes, calculating another relay tree configuration for another relay tree that does not include the at least one node and calculate other MSS configurations for the another relay tree.

17. The method of claim 16, wherein at least one of calculating the configuration for the relay tree, calculating the multiple MSS configurations, sending the multiple MSS configurations, sending the switch command, or calculating another relay tree configuration is performed by a node other than one of the plurality of nodes.

18. The method of claim 16, wherein the individual MSS configuration further comprises a description of one or more other nodes of the plurality of nodes comprising at least one of: an inbound link from which the packet will arrive to the individual node or an outbound link to which the individual node will forward the packet.

* * * * *